US007805334B1

(12) United States Patent
Huppert (10) Patent No.: US 7,805,334 B1
(45) Date of Patent: Sep. 28, 2010

(54) METHOD AND SYSTEM FOR PROCESSING RETAIL DATA

(75) Inventor: Andreas Huppert, Neulussheim (DE)

(73) Assignee: SAP AG, Walldorf (DE)

( * ) Notice: Subject to any disclaimer, the term of this patent is extended or adjusted under 35 U.S.C. 154(b) by 1420 days.

(21) Appl. No.: 10/863,816

(22) Filed: Jun. 8, 2004

(51) Int. Cl.
*G06Q 20/00* (2006.01)
(52) U.S. Cl. .............................. 705/16; 705/17; 705/21
(58) Field of Classification Search ........................ None
See application file for complete search history.

(56) References Cited

U.S. PATENT DOCUMENTS

| 4,405,987 | A | 9/1983 | Spalti |
| 4,568,934 | A | 2/1986 | Allgood |
| 4,922,419 | A | 5/1990 | Ohashi et al. |
| 5,400,253 | A | 3/1995 | O'Connor |
| 5,451,755 | A | 9/1995 | Duval et al. |
| 5,924,892 | A | 7/1999 | Ferracina |
| 5,930,771 | A | 7/1999 | Stapp |
| 6,058,373 | A | 5/2000 | Blinn et al. |
| 6,088,363 | A | 7/2000 | Shiobara |
| 6,144,887 | A | 11/2000 | Kamiya et al. |
| 6,311,165 | B1 | 10/2001 | Coutts et al. |
| 6,389,375 | B1 | 5/2002 | Thomsen et al. |
| 6,507,851 | B1 | 1/2003 | Fujiwara et al. |
| 6,512,966 | B2 | 1/2003 | Lof et al. |
| 6,633,823 | B2 | 10/2003 | Bartone et al. |
| 6,640,278 | B1 | 10/2003 | Nolan et al. |
| 6,697,951 | B1 | 2/2004 | Sinha et al. |
| 6,763,999 | B2 | 7/2004 | Coventry |
| 6,785,592 | B1 | 8/2004 | Smith et al. |
| 6,850,820 | B2 | 2/2005 | Tajima |
| 6,904,385 | B1 | 6/2005 | Budike, Jr. |
| 6,910,017 | B1 | 6/2005 | Woo et al. |
| 6,963,854 | B1 | 11/2005 | Boyd et al. |
| 6,980,966 | B1 | 12/2005 | Sobrado et al. |
| 6,997,642 | B2 | 2/2006 | Bishop, Jr. |
| 7,043,459 | B2 | 5/2006 | Peevey |
| 7,072,843 | B2 | 7/2006 | Menninger et al. |
| 7,092,929 | B1 | 8/2006 | Dvorak et al. |
| 7,117,165 | B1 | 10/2006 | Adams et al. |
| 7,139,731 | B1 | 11/2006 | Alvin |
| 7,379,890 | B2 | 5/2008 | Myr et al. |
| 2002/0023500 | A1 | 2/2002 | Chikuan et al. |
| 2002/0026368 | A1 | 2/2002 | Carter, III |

(Continued)

FOREIGN PATENT DOCUMENTS

JP 2004-30343 A 1/2004

OTHER PUBLICATIONS

U.S. Appl. No. 60/374,892, filed Apr. 22, 2002, Krajec.

(Continued)

*Primary Examiner*—F. Zeender
*Assistant Examiner*—Christopher Buchanan
(74) *Attorney, Agent, or Firm*—Foley & Lardner LLP (57) ABSTRACT

A system for communicating retail data from a point of sale system to a data warehouse independent of a merchandising system. The system includes an inbound data interface configured to receive the retail data from the point of sale system, an inbound processing engine configured to apply one or more retail data processing rules to the retail data to generate processed retail data, and an outbound data interface configured to send the processed retail data to the data warehouse.

38 Claims, 9 Drawing Sheets

U.S. PATENT DOCUMENTS

| | | | |
|---|---|---|---|
| 2002/0078159 | A1 | 6/2002 | Petrogiannis et al. |
| 2002/0107713 | A1 | 8/2002 | Hawkins |
| 2002/0138176 | A1 | 9/2002 | Davis et al. |
| 2002/0147668 | A1 | 10/2002 | Smith et al. |
| 2002/0173990 | A1* | 11/2002 | Marasco ................. 705/2 |
| 2002/0184116 | A1 | 12/2002 | Tam et al. |
| 2003/0023500 | A1 | 1/2003 | Boies et al. |
| 2003/0028437 | A1 | 2/2003 | Grant et al. |
| 2003/0046195 | A1 | 3/2003 | Mao |
| 2003/0065646 | A1 | 4/2003 | Joseph et al. |
| 2003/0074250 | A1 | 4/2003 | Burk |
| 2003/0130883 | A1 | 7/2003 | Schroeder et al. |
| 2003/0144864 | A1 | 7/2003 | Mazzarella |
| 2003/0158791 | A1 | 8/2003 | Gilberto et al. |
| 2003/0172007 | A1 | 9/2003 | Helmolt et al. |
| 2003/0229502 | A1 | 12/2003 | Woo |
| 2003/0233307 | A1 | 12/2003 | Salvadori et al. |
| 2004/0068443 | A1 | 4/2004 | Hopson et al. |
| 2004/0098358 | A1 | 5/2004 | Roediger |
| 2004/0102872 | A1 | 5/2004 | Schick et al. |
| 2004/0107141 | A1 | 6/2004 | Conkel et al. |
| 2004/0107180 | A1 | 6/2004 | Yoshida |
| 2004/0122766 | A1 | 6/2004 | Brooks et al. |
| 2004/0162763 | A1 | 8/2004 | Hoskin et al. |
| 2004/0186783 | A1 | 9/2004 | Knight et al. |
| 2004/0199441 | A1* | 10/2004 | Mayfield ................. 705/35 |
| 2004/0210542 | A1 | 10/2004 | Sweeney |
| 2004/0220861 | A1 | 11/2004 | Morciniec et al. |
| 2004/0267674 | A1 | 12/2004 | Feng et al. |
| 2005/0055283 | A1 | 3/2005 | Zarovinsky |
| 2005/0060270 | A1 | 3/2005 | Ramakrishnan |
| 2005/0086122 | A1 | 4/2005 | Cirulli et al. |
| 2005/0096947 | A1 | 5/2005 | Fox et al. |
| 2005/0096963 | A1 | 5/2005 | Myr et al. |
| 2005/0102192 | A1 | 5/2005 | Gerrits et al. |
| 2005/0102227 | A1 | 5/2005 | Solonchev |
| 2005/0165659 | A1 | 7/2005 | Gruber |
| 2005/0177442 | A1* | 8/2005 | Sullivan et al. ........... 705/26 |
| 2005/0197887 | A1* | 9/2005 | Zuerl et al. .............. 705/10 |
| 2005/0209906 | A1* | 9/2005 | Bayoumi et al. ........... 705/10 |
| 2006/0036507 | A1 | 2/2006 | Pujar et al. |
| 2006/0112099 | A1 | 5/2006 | Musgrove et al. |
| 2006/0149653 | A1 | 7/2006 | Davis et al. |
| 2006/0178986 | A1 | 8/2006 | Giordano et al. |
| 2006/0259376 | A1 | 11/2006 | Ferreri et al. |
| 2007/0239373 | A1 | 10/2007 | Nasle |
| 2007/0271185 | A1* | 11/2007 | Engler et al. ............. 705/51 |

OTHER PUBLICATIONS

"Beyond Markdown Management", summer/autumn 2003, the 4caster, Issue 4, vol. 2, 4 pages.

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Melcher, "Local tech firm creates retail markdown tool", Mar. 24, 2000, Cincinnati Business Courier, 3 pages.

News Service Science, "A virtual power station in the resing for . . . a virtual power station in the resin for the power supply from tomorrow", Yokes Brikmann Technical University of Clausthal, pp. 1-2 (Sep. 8, 2004) (http://www.idw-online.de/pages/de/news85375 (Mar. 18, 2006).

Profitlogic, available at http://webarchive.org/web/2002060311838/, available at least by Apr. 15, 2005, 22 pages.

Rheinland-Pfalz, "Virtuelles Kraftwerk-Intelligente Energie fur Klima- and Ressourcenschutz", Secretary of State of Margit Conrad, Stefanie center two emperor Friedrich road 1.55116 Mainz, pp. 1-5 (Jun. 06, 2005) (with translation) (2 pages).

Siemens AG—PoF 1/02 Artike 121 Energieversorgung Irtuelle Kraftwerke (www.siemens.com) (Mar. 18, 2006).

Subrahmanyan et al., "Developing optimal pricing and inventory policies for retailers who face uncertain demand", Journal of Retailing, vol. 72, No. 1, Spring, 1996, 15 pages.

Verivox, http://www.verivox.de/News/ArticleDetails.asp?aid=10141 (Mar. 18, 2006) (4 pages) (with translation).

Virtual Power Station, http://de.wikipedia.org/wiki/Virtuelles_Kraftwerk (Mar. 18, 2006) (4 pages) (with translation).

Office Action for U.S. Appl. No. 10/927,645, mailed Apr. 1, 2009, 32 pages.

Office Action for U.S. Appl. No. 10/927,645, mailed Feb. 23, 2010, 29 pages.

Office Action for U.S. Appl. No. 10/927,645, mailed Oct. 15, 2008, 19 pages.

Office Action for U.S. Appl. No. 10/927,645, mailed Sep. 2, 2009, 32 pages.

Office Action for U.S. Appl. No. 11/028,491, mailed Dec. 22, 2009, 16 pages.

Office Action for U.S. Appl. No. 11/028,491, mailed Dec. 9, 2008, 15 pages.

Office Action for U.S. Appl. No. 11/028,491, mailed Jun. 22, 2009, 14 pages.

Office Action for U.S. Appl. No. 11/028,491, mailed May 27, 2008, 11 pages.

Office Action for U.S. Appl. No. 11/529,739, mailed Jan. 22, 2010, 20 pages.

Office Action for U.S. Appl. No. 11/529,739, mailed Jul. 14, 2009, 20 pages.

Office Action for U.S. Appl. No. 11/529,739, mailed Mar. 12, 2009, 7 pages.

Office Action for U.S. Appl. No. 11/529,739, mailed Sep. 29, 2008, 13 pages.

Office Action for U.S. Appl. No. 11/590,192, mailed Nov. 27, 2009, 9 pages.

Office Action for U.S. Appl. No. 11/646,824, mailed Mar. 31, 2010, 18 pages.

Office Action for U.S. Appl. No. 11/646,824, mailed Sep. 16, 2009, 18 pages.

* cited by examiner

METHOD AND SYSTEM FOR PROCESSING RETAIL DATA

FIELD OF THE INVENTION

The present invention relates generally to the field of methods and systems for processing retail data. More particularly, the present invention relates to methods and systems for processing retail data received from point-of-sale systems for incorporation in a data warehouse.

BACKGROUND OF THE INVENTION

Maintaining accurate and up to date sales and goods movement data is important for the success of any business. Movement data can be used to analyze the strengths and weaknesses of the business. For example, movement data may be used to identify particularly well selling items, such that additional quantities of that item may be reordered, the strong sales may be capitalized upon, etc. Further, the movement data may be analyzed to recognize market trends, viability of product lines, productivity of various businesses, etc. Similarly, movement data may be used to identify the volume of returns for any item, spoilage of goods, etc. Tracking goods movement allows a business to identify potentially inferior products, predict shelf life, etc.

Generally, sales and goods movement data may be tracked using a point-of-sale (POS) system. POS systems are systems generally located in stores or other locations where the sale takes place. POS systems may have varying degrees of sophistication with respect to both the amounts and types of sales and movement data they are capable of tracking. For example, a POS system may be a simple cash register system configured to track only the amount of money received. Alternatively, the cash register system may be a sophisticated computing system configured to track as much data as possible for every transaction. Exemplary data which may be tracked by POS systems include inventory effect data, customer information, payment data, date describing additional items purchased in the same transaction, returned items, damaged items, etc.

Although POS systems such as described above may be standalone systems, such systems are often communicatively coupled (e.g., via a LAN or WAN, a dial-up connection, the interne, etc.) to enterprise resource planning (ERP) systems, which are also known as transactional data processing systems, merchandizing systems, operational systems, etc. In these situations, the data generated by the POS systems (e.g., cash registers) may be transferred to the ERP systems on a receipt level basis and/or aggregate basis in either batch mode (e.g., at the end of a day or cycle) or in substantially real time as each transaction occurs.

In addition to ERP systems, POS systems are also frequently communicatively coupled to business warehouse (BW) systems, which are also known as data warehouses. In these situations, the POS systems are typically coupled to the BW systems through the ERP systems. Thus, the receipt level and/or aggregate sales data generated by the POS systems typically must pass through the ERP system to reach the BW system. Once in the BW system, the advanced reporting and analysis functions typically available in such systems can be used to perform assortment planning, marketing, and other strategic and operational planning decisions based on the received POS data.

In many cases, a large portion of the sales and movement data generated by the POS systems and transferred through the ERP system to the BW system for strategic analysis and long term storage is not even utilized in the ERP system. Because such POS data can be rather voluminous, this configuration may place an unnecessary burden on the ERP system. Moreover, for some businesses (e.g., franchise operations) there may be no operational data going into an ERP system that can be fed to the BW system for strategic analysis and planning. For example, independently owned and operated service stations typically sell gasoline that is owned and handled by the franchise, while the convenience items (e.g., snacks, beverages, cigarettes) may be owned and handled by the service station owner. In these situations, the franchise will likely not have an ERP system that is tracking the convenience items because they are not responsible for their day to day operation (e.g., ordering, restocking, etc). Even so, the franchise may be interested in the sales data generated by the POS system for the convenience items to allow for cross-promotion opportunities or for other strategic reasons (e.g., assessing the financial strength and cash flow of the franchisee). In these situations, the BW system owned by the franchise cannot be coupled to an ERP system to receive the sales and movement data generated by the POS systems. Additional potential problems that may arise from relying on the ERP system for access to the POS system data include the potential for additional time delays in receiving the data as well as the additional costs of installing and maintaining an ERP system which, as noted above in the franchise example, may not be required.

To maximize sales and minimize inventory, businesses may need to react quickly (e.g., within days or even hours) to changes in consumer behavior and customer demand for convenience, choice, and value. Businesses may desire to receive the data necessary to detect and understand such changes even when they do not directly relate to products of the businesses. Accordingly, there is a need for a data processing system and method configured to facilitate the transfer of data from one or more POS systems to a BW system where the data can be analyzed and reported. There is further need for such a system and method configured to facilitate processing and error handling for the POS data.

SUMMARY OF THE INVENTION

One embodiment of the invention relates to a system for communicating retail data from a point of sale system to a data warehouse independent of a merchandising system. The system includes an inbound data interface configured to receive the retail data from the point of sale system, an inbound processing engine configured to apply one or more retail data processing rules to the retail data to generate processed retail data, and an outbound data interface configured to send the processed retail data to the data warehouse.

Another embodiment of the invention relates to a system for processing retail data independent of a merchandising system. The system includes a point of sale system configured to generate retail data based on retail transactions, a data warehouse configured to store the retail data, and a point of sale inbound processing engine configured to receive the retail data from the point of sale system, perform retail processing steps on the retail data, and transmit the retail data to the data warehouse.

Yet another embodiment of the invention relates to a method for communicating retail data to a data warehouse independent of a merchandising system. The method includes receiving retail data from a point of sale system, processing the retail data by applying one or more retail data processing rules to obtain processed retail data, and transferring the processed retail data to the data warehouse.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION OF EXEMPLARY EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, processes, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
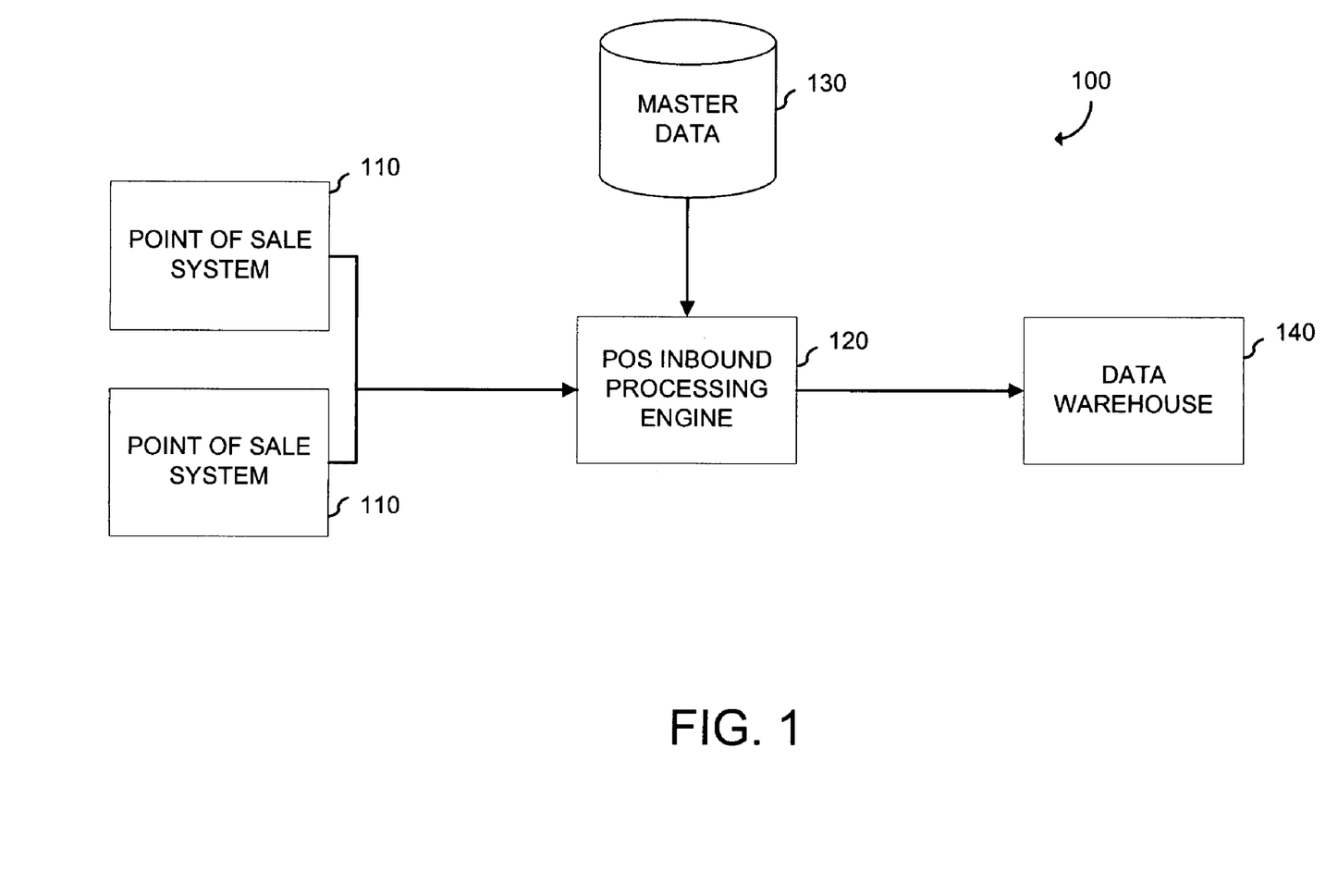
FIG. 1 is a general block diagram illustrating a retail data processing system for processing data related to retail operations and planning, according to an exemplary embodiment.

Referring now to FIG. 1, a general block diagram illustrates a retail data processing system 100 for processing data related to retail operations and planning according to an exemplary embodiment. Retail data processing system 100 includes one or more point-of-sale (POS) systems 110, a POS inbound processing engine (PIPE) 120, a master data repository 130, and a data warehouse 140.

According to an exemplary embodiment, retail data processing system 100 may include additional components configured to manage and implement processing functions or provide additional information for retail data processing. For example, retail data processing system 100 may further include additional components such as an enterprise resource planning system configured to allow a business to manage operational aspects of a business (e.g., inventory management), an integration server, a forecasting engine, a replenishment engine, etc. The components of retail data processing system 100 may further be interconnected such that information may be freely exchanged between the components of retail data processing system 100 and/or any external components associated with system 100.

POS systems 110 may be cash register systems associated with retail store locations. The cash register systems may be configured to perform a number of functions associated with retail store operation such as pricing implementation, inventory control, data management, etc. POS systems 110 may be standalone systems tracking data that can be uploaded at the end of a day or other cycle, or interconnected systems that can be configured to upload sales data in real time.

For example, for each transaction, a POS system 110 may be configured to record and/or transmit a variety of information associated with the transaction. Exemplary information may include information related to the customer, such as typical purchases, payment information, a listing of the items in the transaction, the effect of the transaction on inventory levels, etc.

Each POS system 110 may further be configured to receive updates over a network that may affect the operation of the point-of-sale system. Exemplary updates may include price changes, promotional information, customer information, inventory information, etc.

PIPE 120 may be any type of computing system configured to receive transaction details from one or more POS systems 110 and process the data for inclusion in a data repository such as data warehouse 140. PIPE 120 is further discussed below with reference to FIG. 2.

PIPE 120 may be implemented as a single system, a distributed system, or any combination thereof. PIPE 120 may be implemented using a single computing system, a plurality of computing systems, software, hardware, or any other system or combination of systems to perform the functions described herein.

Master data repository 130 may be any type of data repository configured to receive, store, and provide master data affecting the operation of the system 100. Master data may include a variety of data relevant to the processing of the retail transactions. The master data may be a database representation of a store and/or product, containing data for that store or product such as stock keeping units (SKUs), store IDs and name, sales numbers, reference units, etc. For example, the master data may include a listing of transaction verification information, currency conversion rates, etc.

Data warehouse 140 is a data repository configured to receive, sort, and process information related to retail operations and planning. Data warehouse 140 may also be implemented using a single or multiple systems. Data warehouse 140 may further include one or more functions associated with it to permit a user to efficiently organize and retrieve stored data. Preferably, data warehouse 140 is a SAP BW database provided by SAP.

According to alternative embodiments, retail data processing system 100 may include more, fewer, or different systems than described above to facilitate processing of data for retail operations. In addition, functions associated with one or more systems described above may alternatively be associated with one or more alternative systems. For example, PIPE 120 may be implemented as a component on the front end of data warehouse 140.

In operation, PIPE 120 is configured to receive transaction data from the one or more POS systems 110 without going through an ERP system, perform one or more functions on the transaction data, and transmit the processed data for storage in data warehouse 140. Processing the transaction data may include converting the transaction data into a format appropriate for storage in data warehouse 140, aggregating the transaction data as needed for specific reporting functions, comparing the transaction data to master data and/or threshold values to determine whether a predefined condition has been met, monitoring the transaction data for errors, etc.

PIPE 120 may be configured such that the majority of the processing of the transaction data occurs in the background. In these situations, the transaction data may be received by PIPE 120, processed, and transferred to data warehouse 140 without human intervention. PIPE 120 may be configured such that automated processing will be interrupted upon the occurrence of a pre-defined condition or an error condition. For example, if PIPE 120 detects that the transaction data received from a particular POS system 110 contains one or more errors, PIPE 120 may be configured to stop processing all transaction data and/or to stop processing data for just the particular transactions containing the errors.

Figure 2:
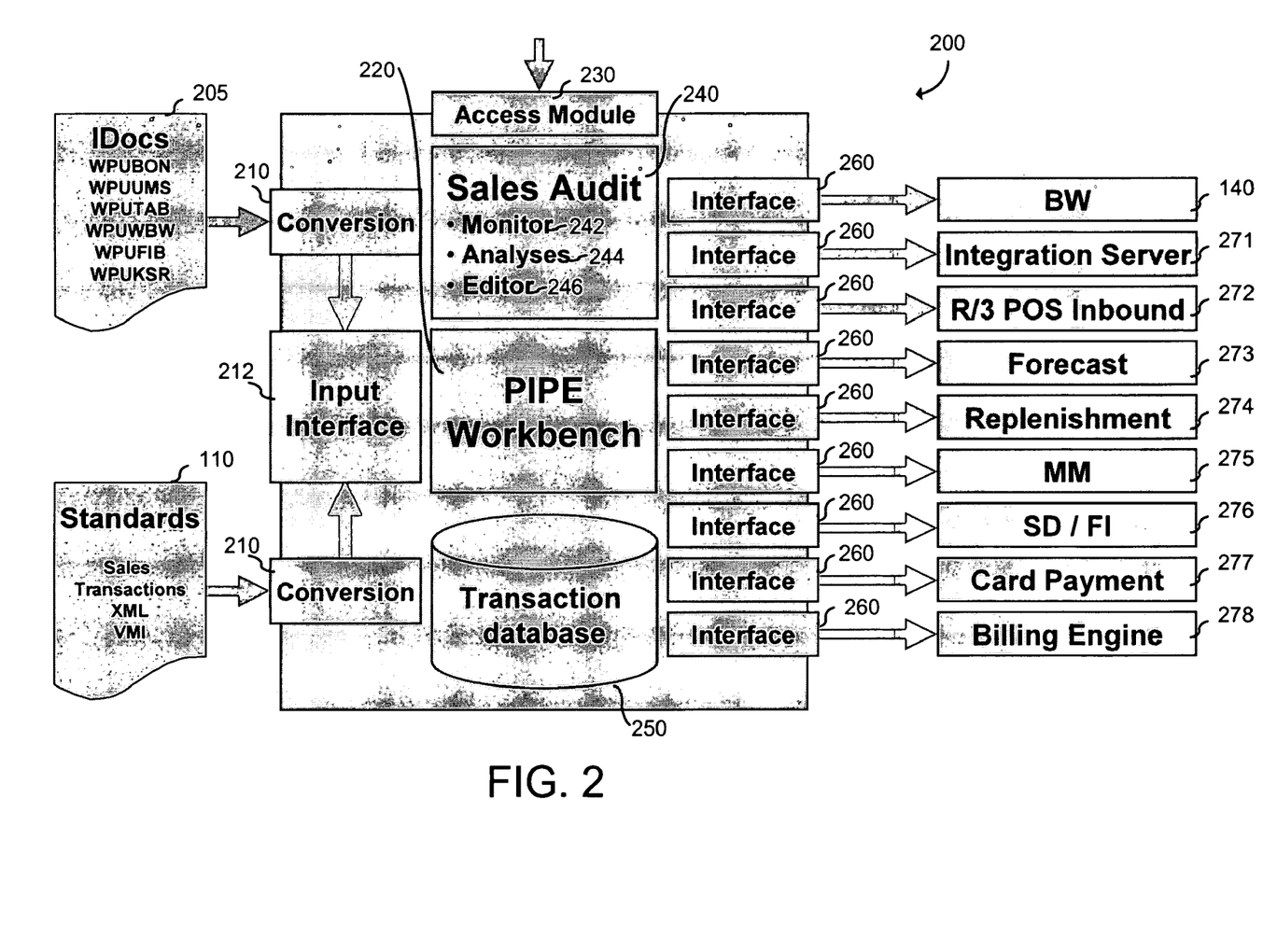
FIG. 2 is a general block diagram illustrating a point-of-sale inbound processing engine (PIPE), according to an exemplary embodiment.

Referring now to FIG. 2, a general block diagram illustrating a PIPE 200 is shown according to an exemplary embodiment. PIPE 200 is configured to receive sales, goods movement, financial movement, and/or control data from one or more point-of-sale systems in any of a variety of formats. The data may be processed within PIPE 200 and provided as output data to one or more systems such as a data warehouse system. Processing may include reviewing the received data for errors, aggregating the received data, comparing the received data to master data and/or threshold values, logging the received data into a transaction database, etc.

PIPE 200 may include one or more inbound data conversion engines 210, a POS workbench 220, a master data access module 230, a sales audit engine 240, a transaction database 250, and one or more output data interfaces 260. PIPE 200 may further include more, fewer, or alternative systems configured to perform the functions described herein. Further, one or more of the systems described or shown in FIG. 2 as being implemented either internally or externally to PIPE 200 may be implemented in the alternative. For example, transaction database 250 may alternatively be implemented as an external component.

Inbound data conversion engines 210 may be any type of engine configured to receive inbound data from one or more point-of-sale systems and convert the data into a format that can be processed by processing engine 200. According to an exemplary embodiment, conversion engines 210 may be implemented as software programs configured to receive data in any of a variety of formats and convert it to the format processed by PIPE 200. According to an exemplary embodiment, conversion engines 210 are configured to convert the data to a Business Applications Programming Interface (BAPI) standard and transfer the input to input interface 212. Input interface 212 can receive data from external or internal conversion modules, or it can be called directly by a point of sale system 110. According to an exemplary embodiment, input interface 212 is a BAPI.

According to exemplary embodiment, a sophisticated point-of-sale system is utilized at the point-of-sale location to generate and track a large volume of transaction data for several different message types. In this embodiment, the data is received by PIPE 200 in the form of one or more importation documents (or IDocs) 205. IDocs 205 are documents containing transaction data that has been formatted to be compatible with the receiving system, and which may be proprietary. For example, a SurePOS point of sale system, manufactured by IBM, is configured to automatically convert transaction data into an IDoc for transmittal to PIPE 200.

As indicated above, IDocs 205 may further include a message type which indicates the type of transactional data that is contained in IDocs 205. Exemplary classifications may include message types to indicate the data in IDocs 205 is detailed sales turnover, article receipts, aggregated payment and sales lists, receipt of goods in-store, financial movement, and recourse statistics. Advantageously, message types may be utilized to reduce the complexity and/or amount of information contained in the message. For example, a specific message type only needs to contain information relevant to that type of message.

Instead of IDocs 205, the transaction data may be received in standard documents 207 directly from any other point-of-sale system in any of a variety of formats, such as an industry standard format IXRetail, and processed by conversion engines 210 for utilization within PIPE 200. Yet further, transaction data may be received as a direct user input to POS workbench 220. Advantageously, the direct input allows for correction of data where an error has occurred within one or more of the point-of-sale systems. Further, the direct input may be utilized to receive data from any point-of-sale location using non-networked or non compatible point-of-sale systems. Processing engine 200 may further receive direct input of data where the data is stored in an industry standard format, such that conversion is not needed.

Figure 5A:
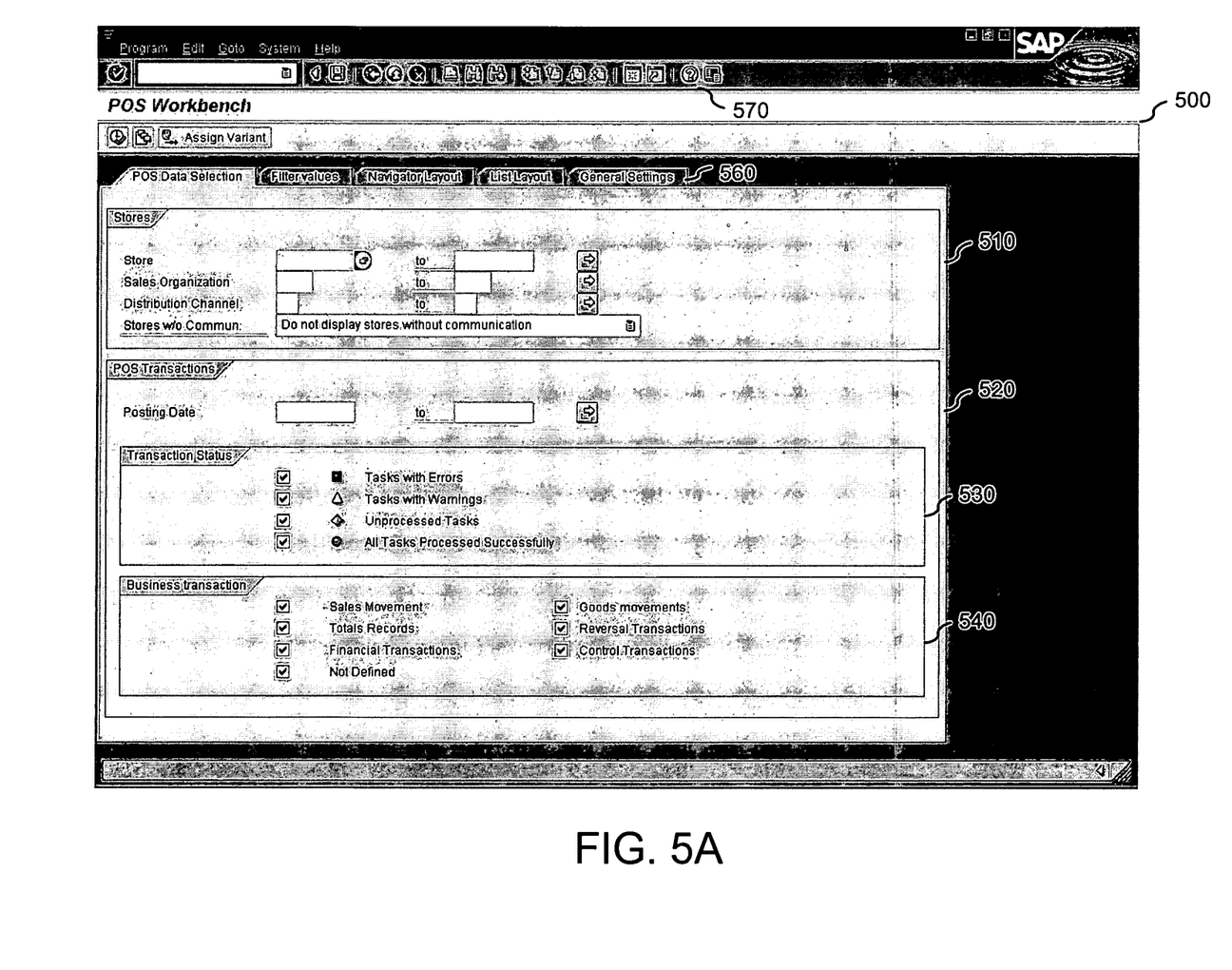
FIG. 5A is a selection user interface screen for a POS workbench, shown in FIG. 2, according to an exemplary embodiment.

POS workbench 220 may be any type of interface configured to allow a user to monitor and intervene in the processing of transactions within PIPE 200. POS workbench 220 is further discussed below with reference to FIG. 5.

Master data access module 230 is a software implemented module consisting of a generic interface, control logic, and buffers. The module further includes access logic configured to allow a user to perform single record and mass data reads and searches on a master data database. The module may be used to access master data related to stores, products, etc.

Sales audit engine 240 may be a processing engine configured to perform one or more processing functions on the transaction data received as input to PIPE 200. According to an exemplary embodiment, sales audit engine 240 includes a transaction monitoring engine 242, a transaction analysis engine 244, and a transaction editor 246.

Transaction monitoring engine 242 may be any type of engine configured to receive transaction data and monitor the transaction data. Monitoring the transaction data may include determining the data transfer status, comparing transaction data to master data, reviewing the transaction data for errors, logging data transfers to external systems, balancing aggregate records of transaction data with individual transaction details, aggregating transaction data, etc.

Transaction analysis engine 244 may be any type of engine configured to receive transaction data and compare the transaction data to one or more predefined conditions. Transaction analysis engine 244 is configured to perform an analysis based on the contents of the transactions. Transaction analysis engine 244 may also be configured to perform error handling functions. For example, when an error is discovered in the transaction data by transaction monitoring engine 242, transaction analysis engine 244 may be configured to provide a description of the error, a source of the error, a possible remedy for the error, etc. Transaction analysis engine 244 may further be configured to update and maintain a log of all error conditions that have occurred in the processing of the transaction data. Transaction analysis engine 244 may also be configured to operate in conjunction with POS workbench 220 to receive and implement user instructions for processing the transaction data containing the error.

Transaction editor 246 may be a system or method configured to any allow a user or automated process to edit one or more transactions processed by PIPE 200. Transaction editing may include editing transaction data based on a detected error condition, either automatically or manually, editing transactions based on an automated process, such as a classification process or a time stamping process, or any other desirable type of editing. As stated, transaction editing may occur as the result of an automated process or manual intervention.

Transaction database 250 may be any type of standard database configured to store, sort, and provide access to transactions processed by PIPE 200. According to an exemplary embodiment, transaction database 250 may be any standard type of database.

Transaction database 250 is configure to store transaction data, a task processing state, and process logs in separate tables. Generally, there is a database record for each POS transaction. Key fields and a few attributes associated with each transaction are available as regular database fields. The larger part of the transaction details may be stored in one field in a binary, compressed format. This database implementation makes read/write access very fast, because only one database table needs to be accessed (instead of accessing >20 tables in a traditional relational design). The compression also saves a significant amount of disk space.

A task state may be maintained in a table that contains the task status by store, business day, task type, a transaction range, etc. Using a range instead of storing the state by individual transaction reduces the number of records in this table, typically by a factor of 100.

A process log contains a detailed log including, for example, user, time, messages, what was changed, etc. for all changes to transaction data, task state, process steps, etc. One record may be written for each change on a store/day level independent of how many transactions were involved. The details may also be written into a compressed, binary field. This also makes access very efficient and saves a significant amount of disk space.

Further, transaction database 250 may include an index table containing some transaction numbers and total turnover on a store/day/business type level, as well as some internal administration information. The index table may be used to make the information shown in FIG. 5B available immediately. The table makes it possible get an immediate overview over the processing of a large number of transactions.

Output data interfaces 260 may include any of a variety of types and implementations of output data interfaces configured to provide data from PIPE 200 to any of a variety of external systems. As shown in FIG. 2, exemplary external systems may include data warehouse 140, described above with reference to FIG. 1, an integration server 271, an ERP system interface 272, a forecasting engine 273, a replenishment engine 274, a material management engine (MM) 275, a sales and distribution/financials engine (SD/FI) 276, a card payment engine 277, a billing engine 278, etc. The external systems may be any type of system external to PIPE 200 that may be configured to utilize the transaction information processed by PIPE 200. The external systems may be implemented to run on the same computing system as processing engine 200, but external to processing engine 200.

Output data interfaces 260 may be customized dependent on the external systems with which they are associated. For example, the output data interface 260 associated with data warehouse 140 may be customized such that the transaction data provided therethrough is in a format that is easily usable by data warehouse 140.

Output data interfaces 260 may further be customized to provide transaction data to the associated external systems according to protocols established for the external systems. For example, when an external system is configured to process batch data, the output data interface 160 may be configured to provide the transaction data to that external system in a batch file. Alternatively, when the external system is configured to process data streams, the output data interface 260 may be configured to output transaction data to the external system in a data stream.

Although multiple output data interfaces 260 are shown in FIG. 2, PIPE 200 may alternatively be configured to include a single output data interface. The single output data interface may be configured to include hardware and/or software that interconnects with any or all of the external systems as needed.

Figure 3:
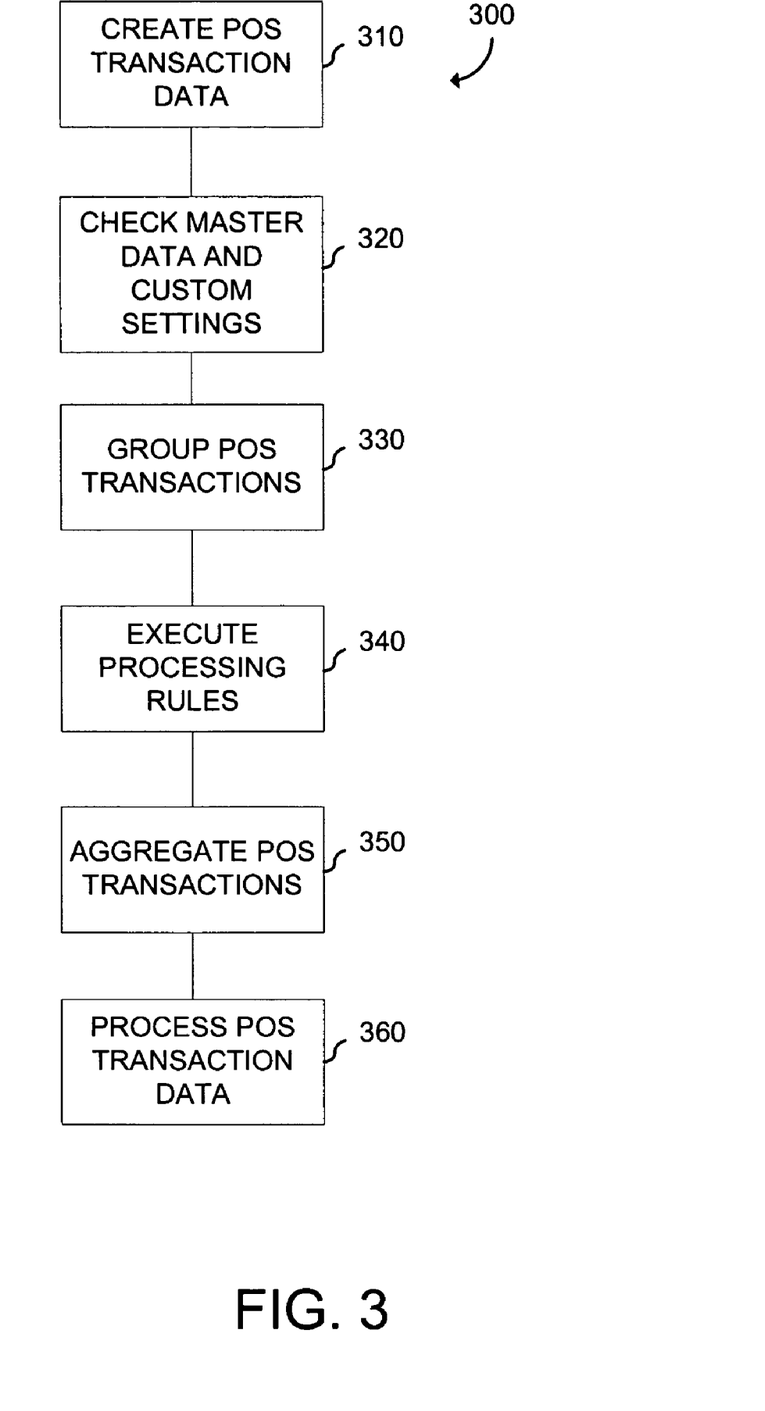
FIG. 3 is a flowchart illustrating a method for processing inbound transaction data in the PIPE, shown in FIG. 2, according to an exemplary embodiment.

Referring now to FIG. 3, a flowchart 300 illustrating a method for processing inbound transaction data in PIPE 200 is shown, according to an exemplary embodiment. Processing inbound transaction data may include execution of one or more tasks. A task may include a series of steps for making data available to an external system such as those described above with reference to FIG. 2. A task may further be an internal process, for example, a process for generating an IDoc, a process for performing a validation check, a manually performed user task, etc. Each task may be configured for immediate processing, or for execution at a given time or based on a triggering event, etc. Processing a task may include execution of steps 320-360, as described below. A task may further include execution by an external system including feedback to processing engine 200 including whether the task was completed and any related data.

In a step 310, PIPE 200 is configure to create point-of-sale data within PIPE 200, further described above with reference to FIG. 2. Creating point-of-sale data may include receiving the data from an external point-of-sale system and storing it in transaction database 250.

Following receipt and storage of the transaction data in step 310, PIPE 200 is configured in a step 320 to read the data required for further processing for all tasks. Reading required data may include reading customizing settings and master data from master data access module 230 for further processing of the tasks.

During reading step 320, the master data and customized setting may be checked for verification. If errors are found during the checks, the POS transactions contained in the task may be given an "Error" status, indicating that the task either should not be processed or should be processed using error handling techniques. The error handling techniques may be implemented using POS workbench 220 and/or access module 240.

In a step 330, the POS transaction data may be grouped according to a time interval set using a customizing engine. Transaction grouping may be utilized to facilitate aggregation of the transaction data where needed. Aggregation may be performed according to any of a variety of criteria. The grouping may further be performed according to a time interval such as daily, hourly, etc.

In a step 340, PIPE 200 is configured to execute processing rules defined in a customizing engine (not shown). Exemplary processing rules may include reviewing transaction data for stability, accuracy and/or reliability, performing custom master data checks, modifying a task's status, etc. In executing the processing rules, PIPE 200 may be configured to check the transaction data against conditions defined within the processing rules. PIPE 200 may further be configured to perform any of a variety of actions based on the condition check. The processing rules may be executed for each POS transaction and task individually.

Execution of the processing rules may include generating one or more results based on the execution. Exemplary results may include postponing the POS transaction processing wherein the status of the task stays as "Ready" or "Ready for Cancellation," but the task is excluded from further processing. For example, this may be done where a POS transaction does not fulfill a precondition that has been defined for the task. Another exemplary result may include changing the status of the task to "Error," "Error During Cancellation," or "Rejected" based on failure to satisfy a condition, such as successfully transferring data to an external system.

In a step 350, PIPE 200 may be configured to aggregate the POS transactions. The aggregation of the POS transactions may be completed using various methods such as aggregating the input transactions and grouping them into packages including a predefined number of items. The number of items contained in any package may be defined in the customizing engine. Following aggregation, further processing may be performed on packages.

In a step 360, PIPE 200 is configured to call a task processing function. Task processing may include performing any task associated with a transaction. Exemplary tasks may include data conversion, generating IDocs, performing credit checks, etc.

Figure 4:
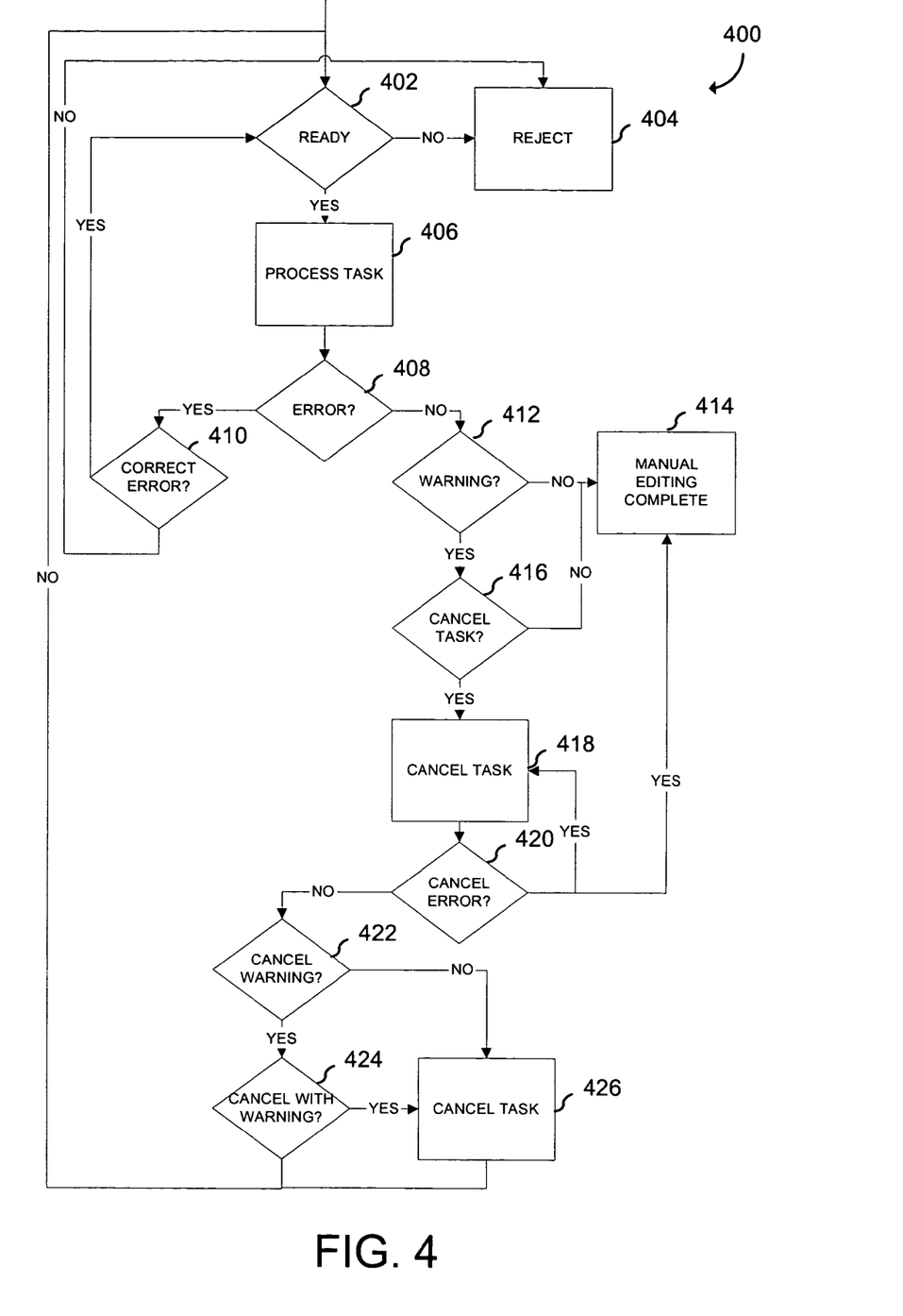
FIG. 4 is a flowchart illustrating a method for changing a status associated with a task to be performed or managed by the processing engine, according to an exemplary embodiment.

Referring now to FIG. 4, a state diagram 400 is shown illustrating potential states during which processing may be performed in modifying a status associated with a task to be performed or managed by processing engine 200, according to an exemplary embodiment. POS Workbench 220 may be configured to allow a user to change the status of tasks through task editor 246. For example, a transaction may be received twice by processing engine 200 having identical receipt numbers, and processing engine may be configured to mark both transaction with an "Error" status. The user may review the transactions and change the state of the desired transaction to "Ready", and the other to "Rejected".

In a state 402, a determination is made whether the task is ready for processing. The determination may be made through manual input received from a user or automated input received through an automated process, such as the comparison of transaction data to master data. If the task is not ready for processing, the task may be rejected without processing in a state 404. If the task is ready for processing, the task is processed in a state 406.

Processing the task in state 406 may include repetition of processing, reviewing transaction data for stability, accuracy and/or reliability, performing administrative functions such as archiving, applying one or more transaction processing rules to the transaction, performing automatic corrections, etc. Following processing, a determination is made in a state 408 whether an error occurred during the processing of the task. If an error did occur, the error may either be corrected in a step state and reviewed again for readiness for processing in state 402, or the task may be rejected without processing in state 404.

If no error occurred during the processing of the task in state 406, a determination is made in a state 412 whether a warning condition occurred during the processing of the task. If no warning occurred, the manual editing process is completed in a state 414.

If a warning condition did occur, a determination may be made in a state 416 whether the task should be cancelled. If the task should not be cancelled, the manual editing process is completed in state 414. If a determination is made in state 416 that the task should be cancelled or if the manual editing for the task is completed in state 414, the task is flagged for cancellation and cancellation is initiated in a state 418.

During the cancellation process, a determination is made in a state 420 whether the cancellation was successfully completed. If an error occurred, an additional attempt may be made to cancel the task or the manual editing process may be competed in state 414. If the cancellation is successful, a determination is made in a state 422 whether a warning condition occurred during the cancellation process. If a warning condition did occur, a determination may be made in a state 424 whether to ignore the warning or to flag the task for processing in state 402. A task may be flagged for "Reprocessing" to provide the user with the ability to make corrections to a task having errors and resubmit the transaction for processing. If no warning occurs or if the determination is made to ignore the warning, the task may be cancelled in a state 426 and flagged for processing in state 402.

The method for editing task status may be performed automatically, manually, or some combination thereof. Although the method steps are described in a specific order, the steps may alternatively be performed in any order depending on the current state of the task being modified. Further, although multiple error and warning handling states are shown, most tasks are generally processed without errors or warnings. Accordingly, some steps may only rarely be utilized.

Referring now to FIG. 5A, a selection user interface screen 500 for the POS workbench 220, described above with reference to FIG. 2, is shown according to an exemplary embodiment. Interface screen 500 is a user interface screen generally configured to allow a user to review transaction data processed by PIPE 200. Interface screen 500 includes a data source selection criteria 510, a data date selection criteria 520, a transaction status selection criteria 530, and a business transaction type selection criteria 540. Interface screen 500 further includes advanced selection tabs 560 and a plurality of functional menu buttons 570.

Interface screen 500 is configured to allow a user to enter selection criteria to selectively recall data stored in transaction database 250 or data currently being processed by PIPE 200. Advantageously, recalling the data allows the user to review any errors, make corrections to transactions, quickly obtain information regarding transaction, or perform any other function.

Data source selection criteria 510 includes a plurality of data source filters configured to allow a user to customize the source of the data that is recalled from transaction database 250. Exemplary filters may include a store filter, a sales organization filter, a distribution channel filter, etc. Advantageously, selecting the data source allows a user to quickly obtain the most relevant information for that user.

Data date selection criteria 520 allows a user to recall data from the transaction database 250 based on the date that the underlying transaction occurred. Transaction status selection criteria 530 allows the user to recall data based on the status of the underlying transactions. Exemplary transaction statuses may include "Tasks with Errors," "Tasks with Warnings," "Unprocessed Tasks," and "All Tasks Processed Successfully." Each task status may be a status generated by an internal process and/or an external system.

Business transaction type selection criteria 540 allows a user to recall data based on the type of the underlying transaction. Exemplary types may include "sales movement," "totals records," financial transactions," "Goods Movements," and "Reversal Transactions."

Advanced selection tabs 560 may be implemented as selectable tabs configured to allow a user to further customize the search parameters. Exemplary customization may include a tab to customize the layout of the navigator displaying search results, a tab to customize the appearance of the list displaying the search results, etc. Functional menu buttons 570 provide navigation and interaction functions for access by the user. Exemplary functions may include move to and from other screens, saving the results of a search, printing the displayed information, etc.

Figure 5B:
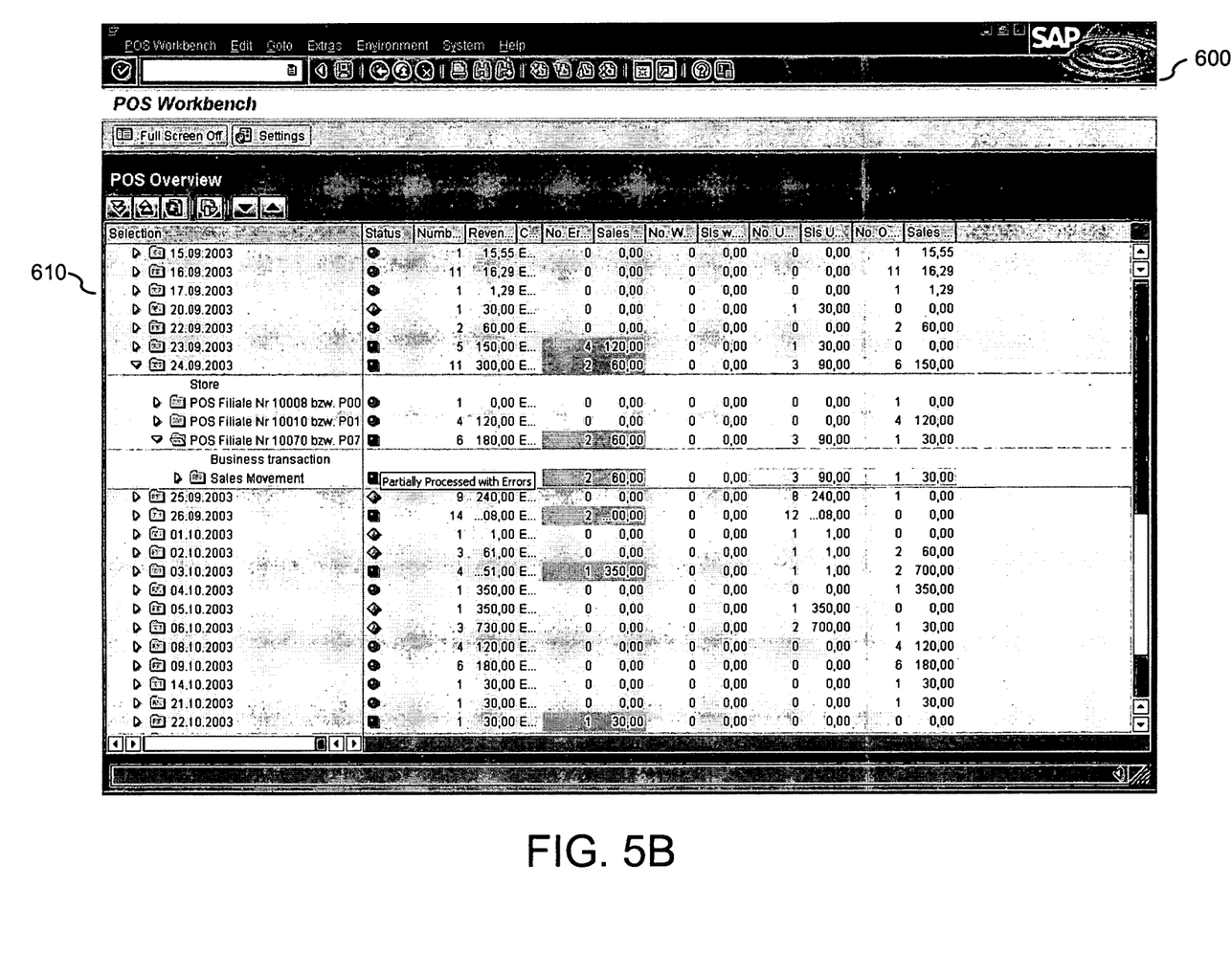
FIG. 5B is a navigation overview user interface screen for the POS workbench, shown in FIG. 2, according to an exemplary embodiment.

Referring now to FIG. 5B, a navigation overview user interface screen 600 for the POS workbench 220, described above with reference to FIG. 2, is shown according to an exemplary embodiment. In a leftmost selection column 610, folders are shown representative of the transaction groupings matching the search criteria that was entered using interface 500 described above. For example, the search criteria may be defined such that all available transactions are displayed, grouped according to the date at which the transaction took place, as shown in FIG. 5B. Alternatively, the user may defined the search criteria such that only tasks with errors are displayed using transaction selection status criteria 530. In this case, only the tasks having a red box in the second column would be displayed. Each folder may further be browsable such that sub-folders grouped according to a different criteria can be represented.

As illustrated in FIG. 5B, navigation overview user interface screen 600 may include a plurality of columns configured to display relevant information regarding the search results. Exemplary information may include the number of transactions occurring on a particular day, the total revenue generated by those transactions, the currency the revenue is represented in, the number of transactions containing errors, the number of transaction with warning, the number of transactions that are unprocessed, the number of processed transactions, the revenues generated by each type of transaction, etc.

Figure 5C:
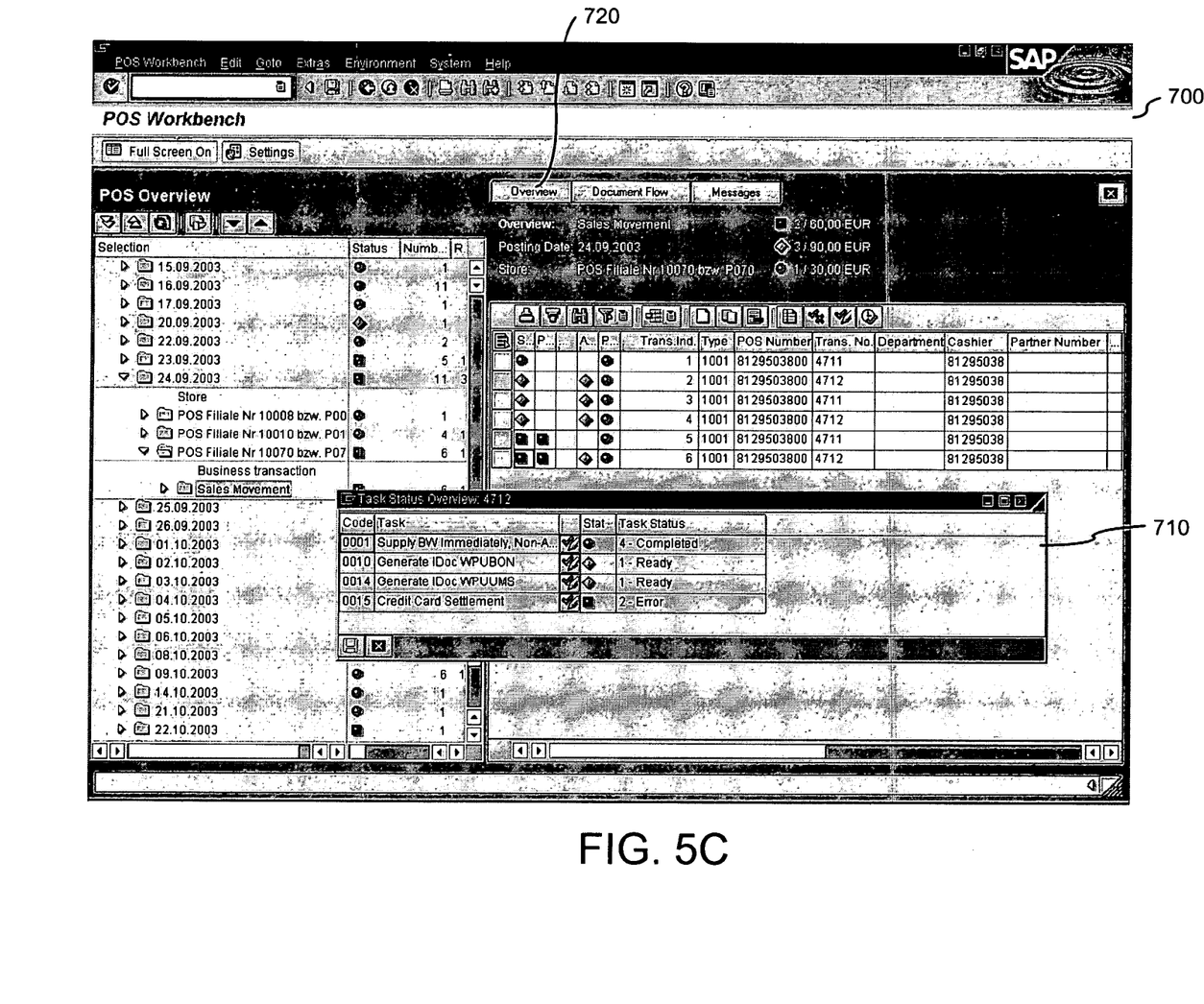
FIG. 5C is a transaction listing interface screen for the POS workbench wherein a user has selected a day/store and chosen a listing of specific business transaction types, according to an exemplary embodiment.

Referring now to FIG. 5C, a transaction listing interface screen 700 for the POS workbench 220 is shown according to an exemplary embodiment. In the illustrated example, a user has selected a day/store and chosen a listing of specific business transaction types. As such, screen 700 in this example is displaying a listing of all sales movement transactions of a specific type occurring at a specific store on a specific day. Each listing may include identification of the task processing status for that transaction, the transaction status for each task associated with the transaction, the transaction identifiers, a cashier number, or any other type of information related to the transaction, such as payment method, etc.

After a specific transaction has been selected, the user may further select the task status overview button 720 to cause the associated task processing status to be displayed in a task overview screen 710. As shown, the processing of each transaction may include a plurality of tasks, such as transferring the data to the data warehouse, generating IDocs, credit card settlement, etc. A failure to complete any task associated with the transaction may result in the transaction being marked with an error flag.

Figure 5D:
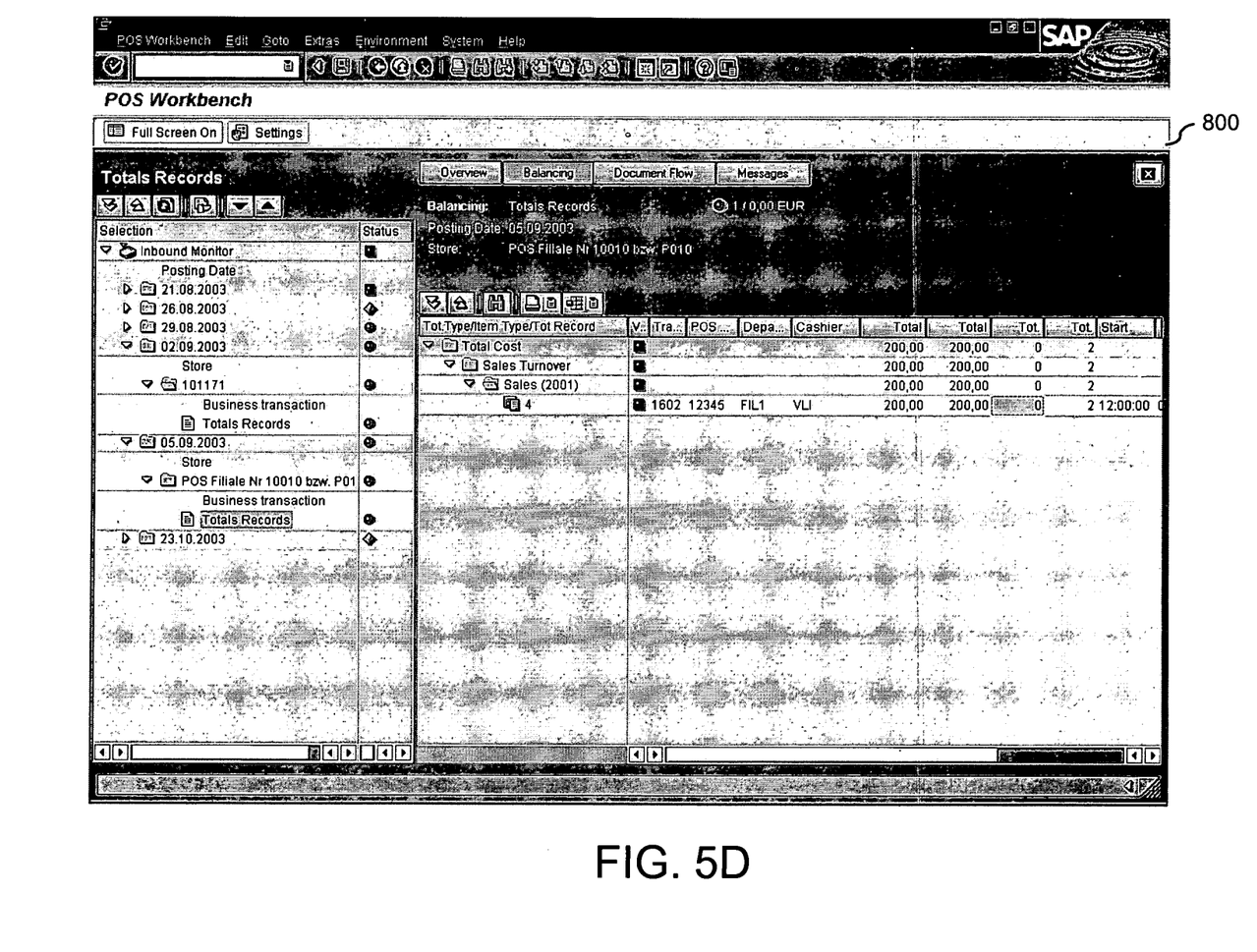
FIG. 5D is a balancing view user interface screen for the POS workbench, shown in FIG. 2, according to an exemplary embodiment.

Referring now to FIG. 5D, a balancing view user interface screen 800 for the POS workbench 220, described above with reference to FIG. 2, is shown according to an exemplary embodiment. Balancing view interface screen 800 may be accessed by selecting a business selection type total record in screen 500. Screen 800 allows a user to compare actual transaction data with a total transaction value supplied by the POS system (e.g., cash register). For example, at the end of a day, a point-of-sale or cash register system may be configured to transmit a total listing providing aggregate data for the day's sales. This listing may be compared to the listing generated by PIPE 200 to determine if there are any inconsistencies. The compared data may include comparison of number of sales, amount of sales, goods movement, etc. The totals can be compared over a single day or any other period of time.

Figure 5E:
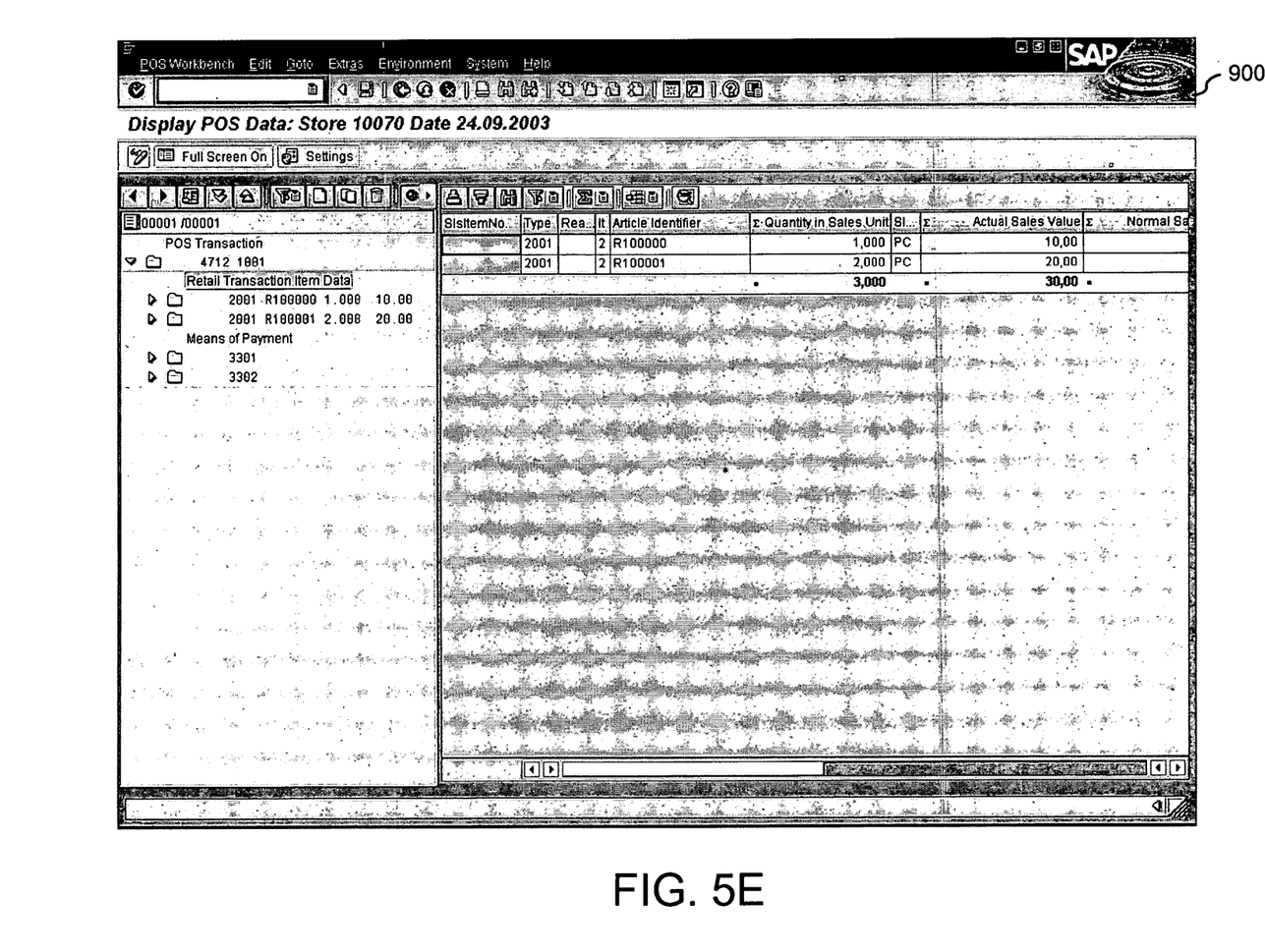
FIG. 5E is a transaction editor user interface screen for the POS workbench shown in FIG. 2, according to an exemplary embodiment.

Referring now to FIG. 5E, a transaction editor user interface screen 900 for the POS workbench 220, described above with reference to FIG. 2, is shown according to an exemplary embodiment. Screen 900 may be used to correct any errors found in the transaction that have been transferred to PIPE 200. Each transaction may be itemized to indicate each item purchased in the transaction, the amount paid for each item, the means of payment, etc. Any value associated with the transaction may be edited.

Although the transactions related to "products," "retail products," and "inventory" are used herein to refer to the sales transactions, the present description will be applicable to processing transactions from the sale of any type of good or service. In either case, the pricing for merchandise being sold and/or services may be controlled or affected by the price planning workbench as described above.

As noted above, embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system comprising:

a point of sale system;

a merchandising system;

a data warehouse;

an inbound processing engine coupled to the point of sale system, the merchandising system and the data warehouse, the inbound processing engine comprising an inbound data interface, a sales audit engine coupled to the inbound data interface and an outbound data interface coupled to the sales audit engine;

the inbound data interface configured to receive retail data directly from the point of sale system and independent of the merchandising system, wherein the inbound processing engine is configured to apply a retail data processing rule to the retail data to generate processed retail data, the sales audit engine comprising a transaction analysis engine, the transaction analysis engine configured to determine an error in the retail data and provide a description of the error, a source of the error and a suggested remedy for the error;

the outbound data interface coupled to the merchandising system and the data warehouse and configured to provide the processed retail data to the merchandising system and the data warehouse for further processing and reporting of the processed retail data, wherein the processed retail data provided to the data warehouse is provided independent of the merchandising system;

a transaction editor configured to allow editing of a first and a second converted retail data;

a transaction database coupled to an input interface and the sales audit engine, the transaction database configured to store transaction data based on the first and second converted retail data for transactions being processed by the inbound processing engine, and to store a task processing state; and a plurality of outbound interfaces coupled to the sales audit engine and the transaction database and configured to send processed retail data to the data warehouse, the merchandising system and at least one of an integration server, a forecast engine, a replenishment engine, a material management engine, a sales and distribution/financials engine, a card payment engine and a billing engine;

wherein the inbound processing engine comprises a first inbound data conversion engine and a second inbound data conversion engine, the first inbound data conversion engine being coupled to the input interface and configured to receive first retail data from at least one point of sale device and to provide the first converted retail data to the input interface based on the received first retail data, the second inbound data conversion engine coupled to the input interface and configured to receive second retail data from the at least one point of sale device and to provide the second converted retail data to the input interface based on the received second retail data;

wherein the sales audit engine is configured to receive the first and second converted retail data;

wherein the transaction analysis engine is configured to receive and compare the first and second converted retail data to at least one predefined condition, the transaction analysis engine being further configured to determine an error in the first and second converted retail data and provide a description of the error, a source of the error and a suggested remedy for the error.

2. The system of claim 1, wherein the inbound processing engine is further configured to determine a data stability.

3. The system of claim 1, wherein applying the retail data processing rule includes receiving master data to be compared to the retail data for validation.

4. The system of claim 1, wherein applying the retail data processing rule to the retail data to detect errors includes comparing individual sales transactions in the retail data to aggregate sales data in the retail data.

5. The system of claim 1, wherein the processed retail data includes aggregated transaction data.

6. The system of claim 1, wherein the inbound processing engine is further configured to determine whether the processed retail data was successfully transferred to the data warehouse.

7. The system of claim 1, wherein applying the retail data processing rule to the retail data includes determining whether the retail data was successfully transferred to an external system based on the retail data processing rules for further processing.

8. The system of claim 7, wherein determining whether the retail data was successfully transferred to the external system includes determining whether a processing task to be performed by the external system was successful.

9. The system of claim 7, wherein the external system is at least one of an integration server, a forecasting engine, a replenishment engine, a material management engine, a sales and distribution/financials engine, a card payment engine, and a billing engine.

10. The system of claim 1, wherein applying the retail data processing rule to the retail data includes determining whether the retail data was successfully transferred to at least two external systems for further processing and further determining whether one or more processing tasks to be performed by each external system was successful.

11. The system of claim 1, wherein the inbound processing engine includes a control function configured to allow a user to specify actions to be taken based on the detection of one or more errors in the retail data.

12. The system of claim 11, wherein the control function may be configured to allow a user to specify actions to be taken based on a type of the detected error.

13. The system of claim 1, further including a transaction processing workbench configured to allow a user to selectively review and/or modify transactions in the retail data.

14. The system of claim 1, wherein the inbound processing engine further includes a transaction database configured to store transaction data received in the retail data for transactions being processed by the inbound processing engine.

15. The system of claim 14, wherein the transaction database is further configured to store a task processing state and process logs.

16. The system of claim 14, wherein the transaction data is sorted and stored in either a first field or a second field, wherein a portion of the transaction data is stored under the first field in a binary compressed format.

17. The system of claim 15, wherein the task processing state is stored in a table by a transaction range and by at least one of a store, a business day and a task type.

18. The system of claim 1, wherein the inbound processing engine is coupled to a master data repository configured to receive, store and provide master data affecting the operation of the system, the inbound processing engine further comprises an access module configured to allow a user to enter, read and search data in the master data repository.

19. The system of claim 1, wherein the sales audit engine further comprises a transaction monitoring engine and a transaction editor.

20. The system of claim 19, wherein the transaction monitoring engine determines a data transfer status, compares the received retail data to the master data, reviews the received retail data for errors, logs data transfers to external systems, aggregates received retail data and balances aggregate records of received retail data with individual transaction details.

21. The system of claim 19, wherein the transaction editor is configured to allow editing of received retail data based on a detected error condition.

22. The system of claim 1, wherein the transaction analysis engine determines the error by comparing the received retail data with at least one predefined condition.

23. The system of claim 1, wherein the transaction analysis engine is further configured to update and maintain a log of errors.

24. A system for processing retail data independent of a merchandising system, comprising:
    a point of sale system configured to generate retail data based on retail transactions;
    the merchandising system;
    a data warehouse configured to store the retail data;
    a point of sale inbound processing engine coupled to the point of sale system, the merchandising system and the data warehouse and configured to receive the retail data directly from the point of sale system and independent of the merchandising system, perform retail processing steps on the retail data, determine an error in the retail data, provide a description of the error, a source of the error and a suggested remedy for the error, the point of sale inbound processing engine is further configured to provide retail data to the merchandising system and the data warehouse, wherein the retail data provided to the data warehouse is provided independent of the merchandising system;
    a transaction editor configured to allow editing of a first and a second converted retail data
    a transaction database coupled to an input interface and the sales audit engine, the transaction database configured to store transaction data based on the first and second converted retail data for transactions being processed by the inbound processing engine, and to store a task processing state; and
    a plurality of outbound interfaces coupled to the sales audit engine and the transaction database and configured to send processed retail data to the data warehouse, the merchandising system and at least one of an integration server, a forecast engine, a replenishment engine, a material management engine, a sales and distribution/financials engine, a card payment engine and a billing engine;
    wherein the inbound processing engine comprises a first inbound data conversion engine and a second inbound data conversion engine, the first inbound data conversion engine being coupled to the input interface and configured to receive first retail data from at least one point of sale device and to provide the first converted retail data to the input interface based on the received first retail data, the second inbound data conversion engine coupled to the input interface and configured to receive second retail data from the at least one point of sale device and to provide the second converted retail data to the input interface based on the received second retail data;

wherein the sales audit engine is configured to receive the first and second converted retail data;

wherein the transaction analysis engine is configured to receive and compare the first and second converted retail data to at least one predefined condition, the transaction analysis engine being further configured to determine an error in the first and second converted retail data and provide a description of the error, a source of the error and a suggested remedy for the error.

25. The system of claim 24, wherein the point of sale inbound processing engine is further configured to format the retail data for storage in the data warehouse.

26. The system of claim 24, wherein performing retail processing steps includes comparing master data to the retail data to check for errors and provide validation.

27. The system of claim 24, wherein performing retail processing steps on the retail data includes transferring the retail data to an external system and determining whether additional processing steps were successfully completed on the external system.

28. The system of claim 27, wherein determining whether additional processing steps were successfully completed on the external system includes determining whether the retail data was successfully transferred to the external system.

29. The system of claim 27, wherein the external system is at least one of an integration server, a forecasting engine, a replenishment engine, a material management engine, a sales and distribution/financials engine, a card payment engine, and a billing engine.

30. The system of claim 24, wherein performing retail processing steps on the retail data includes comparing individual sales transactions in the retail data to aggregate sales data in the retail data to detect errors.

31. The system of claim 24, wherein performing retail processing steps on the retail data includes processing the retail data to generate aggregate transaction data.

32. The system of claim 24, wherein the inbound processing engine includes a control function configured to allow a user to specify actions to be taken based on the detection of one or more errors in the retail transaction data.

33. The system of claim 32, wherein the control function is configured to allow a user to specify actions to be taken based on a type of the detected error.

34. The system of claim 24, further including a transaction processing workbench configured to allow a user to selectively review and/or modify transactions in the retail data.

35. The system of claim 24, further including a transaction database configured to store transaction data for transactions received in the retail data and being processed by the inbound processing engine.

36. The system of claim 24, wherein the point of sale inbound processing engine further includes a transaction database configured to store transaction data received in the retail data for transactions being processed by the inbound processing engine.

37. The system of claim 36, wherein the transaction database is further configured to store a task processing state and process logs.

38. The system of claim 36, wherein the transaction data is sorted and stored in either a first field or a second field, wherein a portion of the transaction data is stored under the first field in a binary compressed format.

* * * * *